United States Patent
Pang et al.

(10) Patent No.: US 12,049,936 B2
(45) Date of Patent: Jul. 30, 2024

(54) EFFICIENT VIBRATION REDUCTION AND ISOLATION BASE SUPPORTED BY CHAINED PANEL FLUID BLADDER

(71) Applicant: Harbin Engineering University, Harbin (CN)

(72) Inventors: Fuzhen Pang, Harbin (CN); Haichao Li, Harbin (CN); Cong Gao, Harbin (CN); Xueren Wang, Harbin (CN); Yuan Du, Harbin (CN); Yang Tang, Harbin (CN); Shengyao Gao, Harbin (CN); Changwei Su, Harbin (CN); Yuxuan Qin, Harbin (CN); Ran Liang, Harbin (CN); Yuhang Tang, Harbin (CN); Xin Li, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/307,072

(22) Filed: Apr. 26, 2023

(65) Prior Publication Data
US 2023/0265907 A1    Aug. 24, 2023

(30) Foreign Application Priority Data
Aug. 4, 2022  (CN) .......................... 202210934675.8

(51) Int. Cl.
*F16F 15/023* (2006.01)
*F16F 15/02* (2006.01)
(Continued)

(52) U.S. Cl.
CPC .......... *F16F 15/023* (2013.01); *F16F 15/022* (2013.01); *F16M 5/00* (2013.01);
(Continued)

(58) Field of Classification Search
CPC .... F16F 15/023; F16F 15/022; F16F 2222/12; F16F 2230/007; F16F 2232/08; F16M 5/00; F16M 11/22; F16M 2200/08
See application file for complete search history.

(56) References Cited

U.S. PATENT DOCUMENTS 9,562,585 B2 *  2/2017  Almazán .............. F16F 15/022
9,995,360 B2 *  6/2018  Khan .................. F16C 11/0614
(Continued)

FOREIGN PATENT DOCUMENTS

EP       849496 A2 *  6/1998  ............. B60N 2/522
KR     1508148 B1 *  4/2015  ............. F16F 15/022

*Primary Examiner* — Eret C McNichols
(74) *Attorney, Agent, or Firm* — IPRO, PLLC

(57) ABSTRACT

The present disclosure provides an efficient vibration reduction and isolation base supported by a chained panel fluid bladder, including a chained panel, the vibration reduction fluid bladder, vertical limiting devices and a bottom plate. The chained panel is a discontinuous structure formed by connecting chained substructure panels in series by panel hinge devices. The vibration reduction fluid bladder and the vertical limiting devices are fixedly installed between the chained panel and the bottom plate. The chained panel is constructed based on the impedance mismatch principle and provided with a mechanical device. Mechanical vibration energy is dissipated twice by the chained panel and the vibration reduction fluid bladder, thereby greatly reducing influences of mechanical device operation on a hull structure. The present disclosure abandons a traditional base design of a continuous panel, is simple in structure and good in vibration reduction performance, and has good economy and wide application prospects.

4 Claims, 3 Drawing Sheets

(51) Int. Cl.
*F16M 5/00* (2006.01)
*F16M 11/22* (2006.01)

(52) U.S. Cl.
CPC .......... *F16M 11/22* (2013.01); *F16F 2222/12* (2013.01); *F16F 2230/007* (2013.01); *F16F 2232/08* (2013.01); *F16M 2200/08* (2013.01)

(56) References Cited

U.S. PATENT DOCUMENTS

| | | | |
|---|---|---|---|
| 10,495,172 B2* | 12/2019 | Thurston | B65D 85/68 |
| 11,624,419 B2* | 4/2023 | Jin | F16F 15/03 |
| | | | 267/140.14 |
| 2004/0195065 A1* | 10/2004 | Folkens | F16F 9/16 |
| | | | 188/380 |

* cited by examiner

EFFICIENT VIBRATION REDUCTION AND ISOLATION BASE SUPPORTED BY CHAINED PANEL FLUID BLADDER

TECHNICAL FIELD

The present disclosure relates to an efficient vibration reduction and isolation base, more particularly relates to an efficient vibration reduction and isolation base supported by a chained panel fluid bladder, and belongs to the technical field of ship mechanical device vibration and noise reduction.

BACKGROUND OF THE DISCLOSURE

Mechanical noise generated during operation of mechanical devices is one of three major noise sources of a ship, and is an important factor influencing ship comfort, economy and ship life. As a large structure of multi-system collaborative operation, the ship has a plurality of mechanical devices to run to maintain its operation, although the mechanical devices are different in kind, the mechanical devices are extremely similar in fixing mode; and all kinds of mechanical devices are connected to a hull board through one or more structures, and the structure is a base structure. As a main carrier for a vibration source of the various mechanical devices of the ship, the base structure is the uppermost channel for transferring device vibration to a hull structure, and is also one of main ways for realizing mechanical device vibration and noise reduction. Nowadays, specialists and scholars have controlled ship mechanical vibration through many ways including base structure parameter dynamics optimization, a high-performance vibration isolator and arranging a vibration absorption device, thereby reducing the ship mechanical noise level. However, existing technical means have limitations, and hardly integrate many advantages of a wide frequency band, low cost, high performance, etc. Thus, designing, based on the waveform conversion theory, an efficient vibration reduction and isolation base supported by a chained panel fluid bladder has certain engineering significance.

It is found through existing literature and patent retrieval, public data related to the present disclosure mainly includes: 1. High-internal-pressure Airbag Damper Theory and Design for Vessel (*Journal of Vibration Engineering*, 2013, 26); 2. Low-load and Low-frequency Marine Airbag Vibration Isolator (*Ship Engineering*, 2021, 43); 3. Airbag-based Three-dimensional Phononic Crystal Vibration Damper disclosed by the Chinese patent literature CN108468738B; and 4. Self-adaptive Airbag Damper disclosed by the Chinese patent literature CN212616053U.

The literature 1 introduces an airbag structure into a large ship vibration isolator, carries out safety, stiffness and inherent frequency analysis on a high-internal-pressure heavy-load airbag vibration isolator, analyzes influences of structural process parameters on vibration isolating performance, proves that the theory is reliable through the test means, and has a big difference with the present patent; the literature 2 designs the marine airbag damper bearing 0.4 t according to the airbag damper design theory, and obtains various performance parameters of the damper through test, the vibration isolating quantity reaches 31 dB, but due to the limited size, the airbag damper involved in the article can be only used for a single machine leg of a mechanical device, and a plurality of vibration isolators are required to be arranged for a large device, resulting in high economic cost, and meanwhile there is still a room for improving the vibration reduction effect; the patent for invention 3 discloses the airbag-based three-dimensional phononic crystal vibration damper, which applies the phononic crystal concept to a vibration reduction structure, an airbag is attached to a metal material scatterer to form two-dimensional phononic crystals which are arranged in a third dimension to form three-dimensional phononic crystals, connection stiffness of the scatterer is controlled through airbag inflation and deflation, a vibration reduction frequency band range is adjusted, there is a big difference with the present disclosure, meanwhile, the phononic crystal is formed by combining the scatterer and a matrix, connection between different materials is a big problem, and when a high-mass device is installed thereon, structural strength is hard to guarantee; and the patent for utility model 4 discloses the self-adaptive airbag damper, an airbag extrusion assembly is connected between a bearing plate and a pedestal, the airbag inflation and deflation function is completed through an internal motor, thereby realizing airbag stiffness adjustment, and due to the arrangement of the motor device, the size of the vibration reduction structure is enlarged, meanwhile, the energy burden is increased, and thus, there is a big difference with the present disclosure.

In conclusion, the retrievable literatures and patents which have been disclosed have the big difference with the present disclosure, and certain limitations exist in issues such as structural mass, structure strength, machining difficulty and economic cost. Thus, the present disclosure designs an efficient vibration reduction and isolation base supported by a chained panel fluid bladder, which has the characteristics of being simple in structure, good in vibration reduction performance, low in machining difficulty, low in economic cost, etc., and has important significance for mechanical device vibration and noise reduction.

SUMMARY OF THE DISCLOSURE

An objective of the present disclosure is to solve substantive issues including that a traditional base is not ideal in vibration reduction effect, and a novel vibration reduction base is high in machining cost. The present disclosure provides an efficient vibration reduction and isolation base supported by a chained panel fluid bladder, and the base is simple in structure, good in vibration reduction performance, low in machining cost and capable of being used for installing and fixing various devices of a ship and realizing an efficient vibration reduction effect.

Technical scheme: in order to solve the above technical problems, the efficient vibration reduction and isolation base supported by a chained panel fluid bladder according to the present disclosure includes a bottom plate for installing a mechanical device and a bottom plate used for being fixedly installed on a hull, the vibration reduction fluid bladder and vertical limiting devices are installed between a panel and the bottom plate, and the vertical limiting devices surround the vibration reduction fluid bladder;

the panel includes panel hinge devices and chained substructure panels; the chained substructure panels are connected in series through the panel hinge devices, a continuous body of the panel has structural mutation at a joint, resulting in structure impedance mismatch, vibration waves are isolated to a certain degree, and part of vibration is attenuated. Bolt holes are formed in the panel and the bottom plate and respectively used for installing the mechanical device and connecting the vibration reduction base and the hull.

Specifically, the vertical limiting device includes a top cover plate, a fixing holder, a connection guide pillar and a pedestal, the top cover plate is installed at a bottom of the chained substructure panel, the pedestal is installed at a top of the bottom plate, and the fixing holder and the connection guide pillar limit displacement between the chained panel and the base bottom plate to only happen in a vertical direction, thereby avoiding tangential force and guaranteeing safety of the base structure. A vibration reduction rubber sleeve may also be installed between the fixing holder and the connection guide pillar, and a bottom end of the guide pillar is provided with a lifting limiting baffle.

Specifically, the panel is a rectangular panel which is equally divided into the plurality of rectangular chained substructure panels in a length direction, the plurality of panel hinge devices arranged along a straight line are installed between the adjacent chained substructure panels at equal intervals, and the straight line is perpendicular to an axis of the rectangular panel. The vibration reduction fluid bladder is preferably in a rectangle shape.

During usage, only longitudinal waves in vibration waves transferred by the chained panel can be downwards transferred to fluid bladders and converted into surface waves in a fluid domain, and energy is mainly distributed on a fluid surface and outwards radiated in the form of acoustic waves, thereby reducing energy transferred to the base, and realizing vibration attenuation. When the mechanical device runs, mechanical vibration is downwards transferred to the chained panel from machine legs, the vibration waves are attenuated in the chained panel to a certain degree and then transferred to the vibration reduction fluid bladder, a liquid load in the fluid bladders dissipates structural vibration to a certain degree in the process, and the attenuated mechanical vibration is transferred to the hull structure through the base bottom plate, and thus, influences of mechanical device operation on hull structure vibration are reduced to the great degree.

Based on the impedance mismatch principle, the base panel is divided into the plurality of chained substructure panels so as to realize combined feature mutation of a continuous structure, transmission and reflection of elastic waves in the structure are intensified, and dissipation of vibration energy in the structure is increased. The chained panel can be separated and combined by the panel hinge devices, and a length of the chained panel can be changed according to actual demands for the base size.

Inventive principle: vibration is propagated in a medium in the form of the elastic waves. Part of the elastic waves are not influenced by a boundary before being propagated to the medium boundary, the kind of waves are known as body waves, and further, the body waves can also be divided into longitudinal waves and transverse waves according to a relationship between a wave propagation direction and a mass point vibration direction. Due to different medium inherent physical properties, a solid medium has shear elasticity, in which the transverse waves and the longitudinal waves can be propagated, but a liquid medium and a gas medium can only propagate the longitudinal waves, and in the transfer process, the phenomenon of energy level splitting may occur due to the different media. Thus, partition treatment is performed on a traditional continuous base panel. When the mechanical device runs, generated vibration is first transferred to the chained panel, and due to impedance character mismatch of the panel after partition treatment, the elastic waves are transmitted and reflected at the structural mutation position, and part of energy is dissipated; and on the basis, according to the characteristics of the body waves, downward transfer of the transverse waves in the chained panel is obstructed by the fluid bladders, most of energy is gathered on the fluid surface in the form of the surface waves, part of vibration energy of the structure is dissipated in the form of the acoustic waves by the fluid medium making contact therewith, and the liquid load acts on the chained panel in the form of being equivalent to damping, thereby reducing transfer of the energy to the base, accelerating energy attenuation, and greatly reducing influences of device vibration on the hull structure.

Beneficial effects: the present disclosure designs the chained panel vibration reduction base based on the impedance mismatch principle, changes a structural form of the traditional base, and reduces the influences of device excitation on ship structure vibration noise by combining the chained panel and the vibration reduction fluid bladder. The present disclosure is simple in structure and high in reliability. The vertical limiting devices avoid lateral shear force, meanwhile, limit a vertical height and guarantee that the fluid bladders are not crushed, and the structures are connected through bolts so as to be convenient to detach; the four major structures are low in machining difficulty, and the manufacturing cost is controllable; the chained panel is composed of a plurality of subsystems, and can be adjusted by dismounting and mounting subsystem plates in combination with the actual size of the device or the base, and device applicability is high; and according to the waveform conversion theory and the energy level distribution principle, the present disclosure dissipates, by the chained panel and the vibration reduction fluid bladder, the vibration energy generated during operation of the mechanical device, and the efficient vibration reduction effect of the base structure is realized by many measures.

By arranging the vertical limiting devices, the integral displacement of the base is limited to only happen in the vertical direction, the magnitude of displacement is limited, the fluid bladders can be prevented from being crushed under a heavy load, and meanwhile the structure damage due to the shear force is avoided to the great degree; the chained panel is composed of a plurality of substructures, the substructure panels are in hinged connection and are flexible in detachment, and size adjustment can be realized by dismounting and mounting the substructure panels according to the actual size of the base; and liquid in the vibration reduction fluid bladder can be replaced so as to improve the vibration reduction effect.

Besides the technical problems to be solved by the present disclosure, the technical features constituting the technical schemes, and the advantages brought by the technical features of the technical schemes, to make the purposes, the technical schemes and the beneficial effects of the present disclosure clearer, other technical problems to be solved by the present disclosure, other technical features included in the technical schemes and the advantages brought by the technical features are more clearly and integrally described in combination with drawings in the examples of the present disclosure below.

Figure 1:
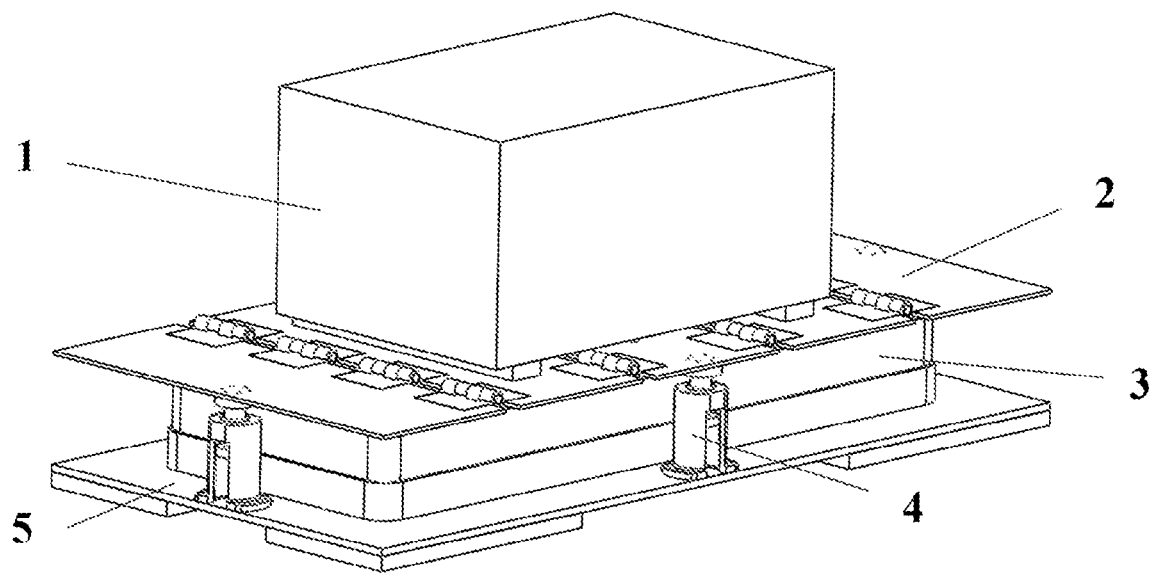
FIG. 1 is an overall structure diagram of an efficient vibration reduction and isolation base supported by a chained panel fluid bladder according to an example of the present disclosure.

In the drawings: 1—mechanical device; 2—chained panel; 3—vibration reduction fluid bladder; 4—vertical limiting device; 5—base bottom plate; 6—panel hinge device; 7—chained substructure panel; 8—vertical limiting device top fixing hole; 9—mechanical device machine leg fixing hole; 10—fluid bladder; 11—fluid bladder fixing fence; 12—top cover plate; 13—fixing holder; 14—pedestal; 15—top fixing bolt hole; 16—vibration reduction rubber sleeve; 17—connection guide pillar; 18—lifting limiting baffle; 19—bottom fixing bolt hole; 20—bottom plate; 21—base fixing hole; 22—vertical limiting device lower fixing hole; and 23—base foot pad.

DETAILED DESCRIPTION OF THE DISCLOSURE

Example

Figure 2:
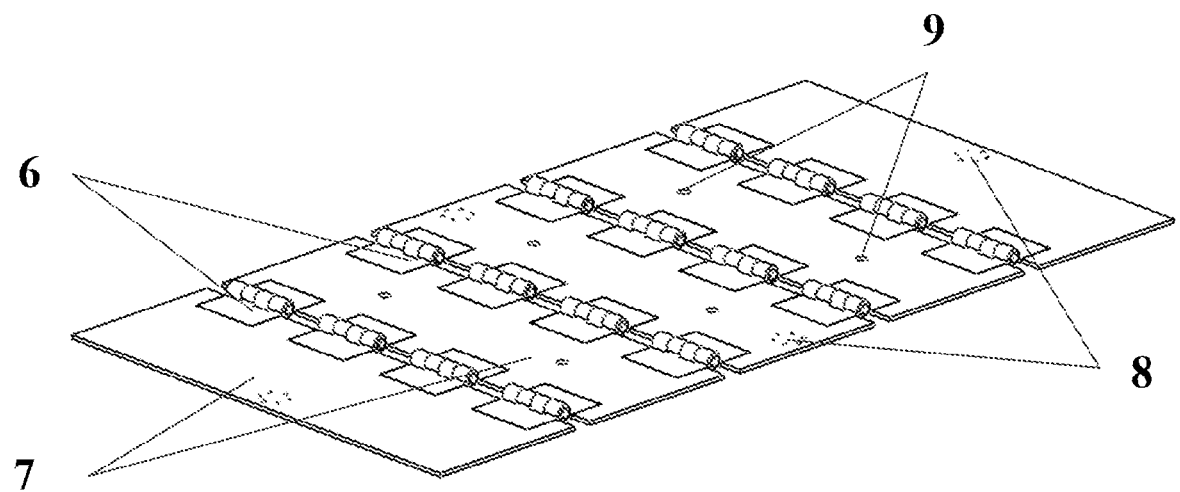
FIG. 2 is a structure diagram of a chained panel in FIG. 1.
Figure 3:
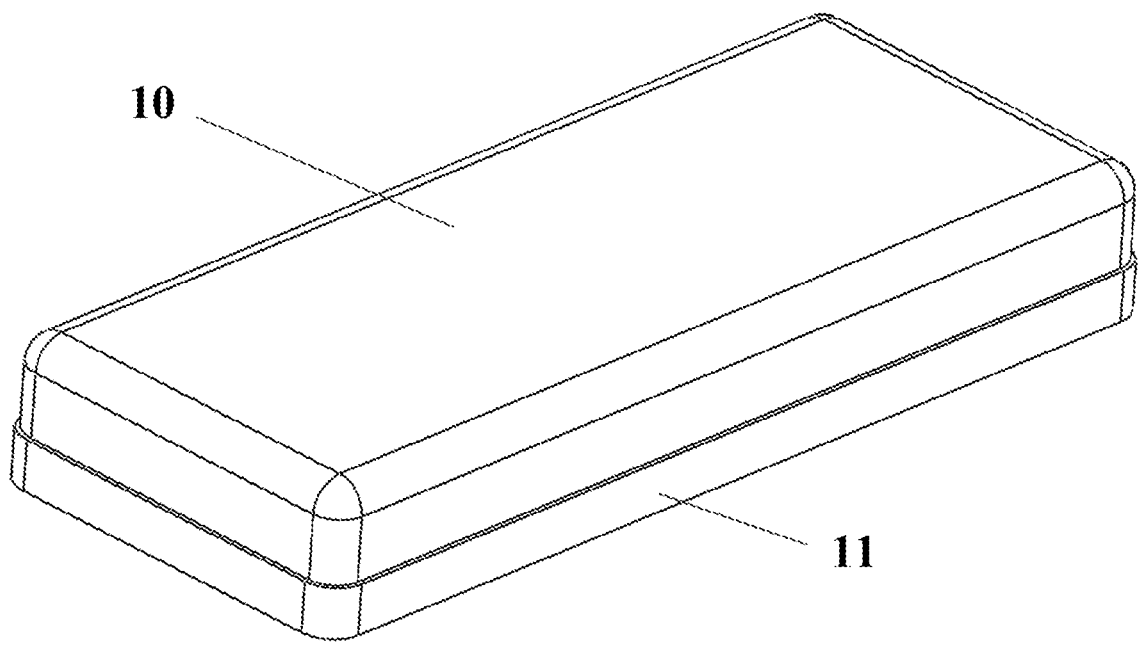
FIG. 3 is a structure diagram of the vibration reduction fluid bladder in FIG. 1.
Figure 4:
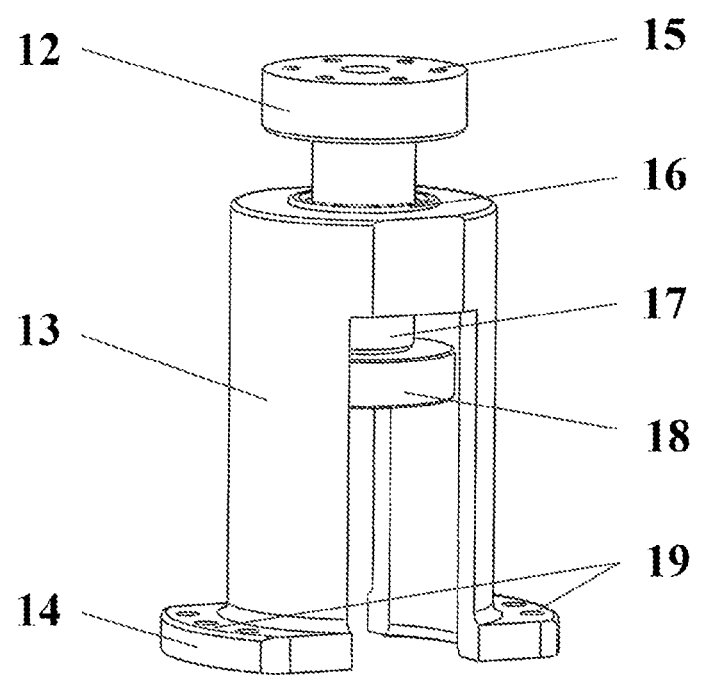
FIG. 4 is a structure diagram of a vertical limiting device in FIG. 1.
Figure 5:
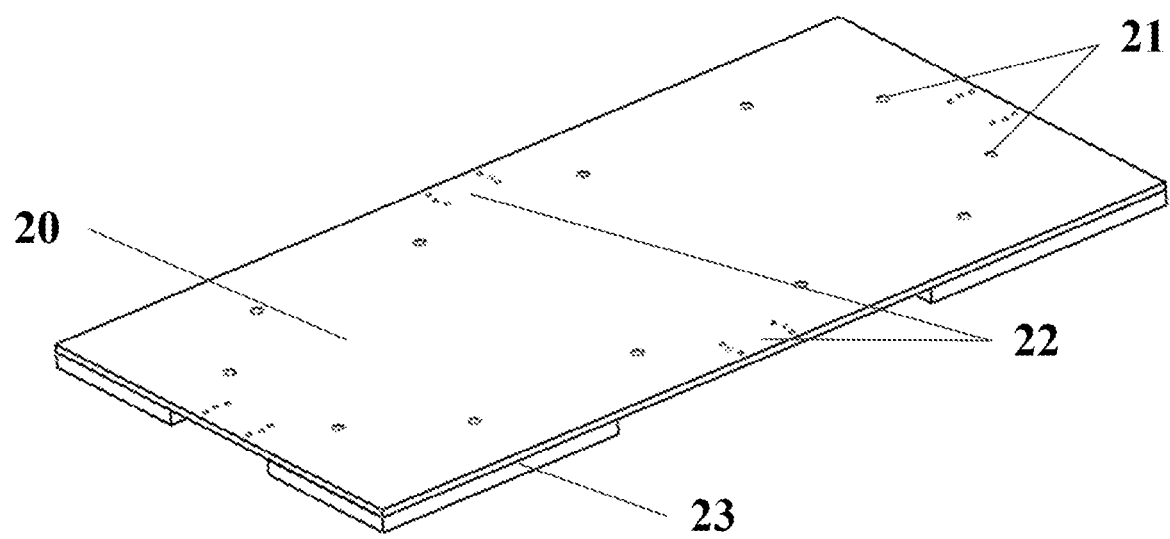
FIG. 5 is a structure diagram of a base bottom plate in FIG. 1.

An efficient vibration reduction and isolation base supported by a chained panel fluid bladder according to the example is shown in FIGS. 1 to 5, and the overall structure of the base is 1200 mm long, 600 mm wide and 180 mm high, and is mainly composed of four major structures including a chained panel 2, a vibration reduction fluid bladder 3, vertical limiting devices 4 and a base bottom plate 5, where the base bottom plate 5 is located at the very bottom of the base structure and is connected and fixed to a hull board, the base is integrally stable, and one vertical limiting device 4 is arranged at a center position of each side of the base bottom plate 5 for limiting a vertical height of the base; the vibration reduction fluid bladder 3 is arranged in a middle of the base bottom plate 5 to mainly play a vibration reduction and support role; the chained panel 2 is installed clinging to the vibration reduction fluid bladder 3 and is connected to the vertical limiting devices 4 to play a waveform conversion and vibration transfer role; finally, a mechanical device 1 is installed on the chained panel 2; and the structures and devices are connected through bolts, and the structure is simple, and convenient to dismount and mount.

According to design requirements, the overall structure of the chained panel 2 is 1200 mm long, 600 mm wide and 5 mm thick, and is formed by combining 5 chained substructure panels 7 and 16 sets of panel hinge devices 6. The chained substructure panel 7 is 220 mm long, 600 mm wide and 5 mm thick, and the panel hinge device 6 is 120 mm long and 90 mm wide, is composed of a left part and a right part and can be detached from a middle joint; 4 sets of panel hinge devices 6 are arranged in a long-side direction of the chained substructure panels 7 at equal intervals, and the panel hinge devices 6 and the chained substructure panels 7 are connected through welding; 4 sets of vertical limiting device top fixing holes 8 are formed in the 5 chained substructure panels 7, and the vertical limiting device top fixing holes 8 is formed by annularly arranging 6 bolt holes with the diameter being 8 mm; and meanwhile 6 mechanical device machine leg fixing holes 9 with the diameter being 14 mm are formed in the chained substructure panels 7.

According to design requirements, the overall structure of the vibration reduction fluid bladder 3 is 1000 mm long, 85 mm wide and 145 mm high, and is mainly composed of fluid bladders 10 and fluid bladder fixing fences 11. The fluid bladder fixing fences 11 are fixed to the base bottom plate 5 through welding, and chamfering treatment is performed on a plate edge, thereby avoiding liquid leakage due to scratch of the fluid bladders 10; and the fluid bladders 10 are arranged in the fluid bladder fixing fences 11 with tops clinging to the chained panel 2, thereby playing a vibration transfer role.

According to design requirements, the vertical limiting device 4 is 100 mm long, 60 mm wide and 145 mm high in a natural state, and is mainly composed of structures including a top cover plate 12, a fixing holder 13, a pedestal 14, top fixing bolt holes 15, a vibration reduction rubber sleeve 16, a connection guide pillar 17, a lifting limiting baffle 18 and bottom fixing bolt holes 19; the pedestal 14 and the fixing holder 13 are fixed through welding, and each of two sides of the pedestal 14 is provided with 3 bottom fixing bolt holes 19 with the diameter being 6 mm; the fixing holder 13 is of a hollow structure with a top through which a limiting body mechanism composed of the top cover plate 12, the connection guide pillar 17 and the lifting limiting baffle 18 penetrates, the top cover plate, the connection guide pillar and the lifting limiting baffle are all of a cylinder structure, have penetration lightening holes with the diameter being 12 mm in centers, and are fixed through welding; the top cover plate 12 is 50 m in diameter and 15 mm in height, and the 6 top fixing bolt holes 15 are formed in the top to be matched with vertical limiting device top fixing holes 8 of the chained panel 2; the connection guide pillar 17 is arranged below the top cover plate 12, and the connection guide pillar 17 is 25 mm in diameter and 55 mm in height; the lifting limiting baffle 18 being 45 mm in diameter and 12 mm in height is welded to a lower portion of the connection guide pillar 17; and the pedestal 14 and the fixing holder 13 are constantly kept to be fixed to the base bottom plate 5, the rest of structures can move relative to the pedestal, and when the device is not installed, the chained panel 2 cannot continue to ascend due to the lifting limiting baffle 18, in a similar way, when the device is installed and starts to run, the top cover plate 12 can limit downward maximum displacement of the chained panel 2 so as to guarantee structure safety, and ensure that the fluid bladders cannot be crushed.

According to design requirements, the base bottom plate 5 is 1200 mm long, 600 mm wide and 10 mm thick, and is provided with 12 base fixing holes 21 with the diameter being 14 mm for fixing between the overall structure of the base and the hull board; four sets, totally 24 vertical limiting device lower fixing holes 22 with the diameter being 6 mm are formed to realize connection between a bottom plate 20 and the vertical limiting devices 4; and four "L"-shaped base foot pads 23 are arranged at four corners of a bottom of the base plate to jack up the base to facilitate installation.

When the mechanical device 1 installed on the chained panel 2 runs and vibrates, vibration is transferred to the chained panel 2 from device machine legs, and due to discontinuous impedance of the chained panel 2, waves are transmitted and reflected at places with structural mutation, resulting in energy attenuation. One part of vibration is transferred by the chained panel 2 to the vibration reduction fluid bladder 3 clinging thereto, according to the waveform conversion theory and the energy level distribution principle, only longitudinal waves are transferred to the fluid bladders in a surface wave form in the process, vibration energy is mainly gathered on a fluid surface, and energy transferred to the base is greatly reduced; and the vertical limiting devices 4 play a vertical displacement limiting role, guarantee integral safety of the base, and can obviously reduce influences of mechanical device vibration on the hull structure.

Based on the impedance mismatch principle, the chained substructure panels are connected into the continuous chained panel by the panel hinge devices, the combined feature of mutation is achieved, transmission and reflection of elastic waves in the structure are intensified, and dissipation of vibration energy in the structure is increased. Due to two-time vibration reduction and dual attenuation by two chains and the fluid bladders, the influences of mechanical device operation on hull structure vibration are greatly reduced.

Specific features, structures, materials or characteristics combined with the example or demonstration are included in at least one example or demonstration of the present disclosure. In the specification, schematic statements of the above terms are not necessarily specific to the same example or demonstration. Moreover, the described specific features, structures, materials or characteristics can be properly combined in any one or more examples or demonstrations.

The present disclosure provides an idea and method of a chained structure for the ship vibration reduction base, there are specifically many methods and ways for implementing the technical schemes, and the described examples are a part rather than all of the examples of the present disclosure. Assemblies, described and shown in the drawings herein, in the examples of the present disclosure may be generally arranged and designed according to different configurations. Thus, the detailed description of the examples of the present disclosure provided in the drawings is not intended to limit the scope of the present disclosure required to be protected, but only represents the selected examples of the present disclosure. Those of ordinary skill in the art can understand that the examples can be variously changed, modified, replaced and transformed without departing from the principle and the purpose of the present disclosure, and the scope of the present disclosure is limited by the claims and equivalents thereof.

The invention claimed is:

1. An apparatus, comprising:
   a chained panel configured to attach to a mechanical device,
   a bottom plate, and
   a fluid bladder and vertical limiting devices between the chained panel and the bottom plate, and the vertical limiting devices surrounding the fluid bladder;
   wherein the chained panel comprises panel hinge devices and chained substructure panels;
   wherein the chained substructure panels are connected in series through the panel hinge devices.

2. The apparatus according to claim 1, wherein at least one of the vertical limiting devices comprises a top cover plate, a fixing holder, a connection guide pillar and a pedestal, wherein the top cover plate is attached to one chained substructure panel of the chained substructure panels, wherein the pedestal is attached to the bottom plate, and wherein the fixing holder and the connection guide pillar are configured to limit displacement between the one chained substructure panel and the bottom plate in a vertical direction.

3. The apparatus according to claim 2, further comprising a sleeve between the fixing holder and the connection guide pillar, and a lifting limiting baffle at a bottom end of the connection guide pillar.

4. The apparatus according to claim 1, wherein the fluid bladder is rectangular.

* * * * *